United States Patent
Roca-Ortega et al.

(10) Patent No.: US 10,654,757 B2
(45) Date of Patent: May 19, 2020

(54) PROCESS FOR PREPARING A STORAGE-STABLE SILICONE RESIN

(71) Applicant: ELKEM SILICONES FRANCE SAS, Lyons (FR)

(72) Inventors: Jose-Luis Roca-Ortega, Vienne (FR); Magali Bousquie, Lyons (FR); Herve Parisot, Caluire et Cuire (FR); Fabien Dupin, Alix (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 0 days.

(21) Appl. No.: 15/559,807

(22) PCT Filed: Mar. 22, 2016

(86) PCT No.: PCT/FR2016/000054
§ 371 (c)(1),
(2) Date: Sep. 19, 2017

(87) PCT Pub. No.: WO2016/151205
PCT Pub. Date: Sep. 29, 2016

(65) Prior Publication Data
US 2018/0065895 A1  Mar. 8, 2018

(30) Foreign Application Priority Data

Mar. 24, 2015 (FR) .................... 15 00576

(51) Int. Cl.
| | |
|---|---|
| *C04B 41/49* | (2006.01) |
| *C08K 5/1515* | (2006.01) |
| *C09D 183/04* | (2006.01) |
| *C08G 77/06* | (2006.01) |
| *C04B 41/00* | (2006.01) |
| *C08G 77/16* | (2006.01) |

(52) U.S. Cl.
CPC ........ *C04B 41/4961* (2013.01); *C04B 41/009* (2013.01); *C08G 77/06* (2013.01); *C08K 5/1515* (2013.01); *C09D 183/04* (2013.01); *C08G 77/16* (2013.01)

(58) Field of Classification Search
CPC ..................................................... C08G 77/70
See application file for complete search history.

(56) References Cited

U.S. PATENT DOCUMENTS

| | | |
|---|---|---|
| 2006/0264567 A1 | 11/2006 | Shiobara et al. |
| 2007/0277326 A1* | 12/2007 | Deruelle ............. C08K 5/5419 8/115.6 |
| 2012/0168780 A1 | 7/2012 | Cha et al. |
| 2014/0088232 A1 | 3/2014 | Mochizuki et al. |
| 2015/0000562 A1 | 1/2015 | Stepp et al. |

FOREIGN PATENT DOCUMENTS

| | | |
|---|---|---|
| GB | 1220381 A | 1/1971 |
| JP | 2001002785 * | 1/2001 |
| WO | 97/47569 A1 | 12/1997 |

OTHER PUBLICATIONS

JP 2001 002785 machine translation (2001).*
International Search Report dated Jun. 8, 2016, and English Translation of the International Search Report corresponding to International Patent Application No. PCT/FR2016/000054, 6 pages.

* cited by examiner

*Primary Examiner* — Kuo Liang Peng
(74) *Attorney, Agent, or Firm* — Dentons US LLP

(57) ABSTRACT

A process is described for preparing a storage-stable mixture including an MDT silicone resin containing hydroxyl groups and an organic compound that contains at least one epoxy group.

36 Claims, No Drawings

PROCESS FOR PREPARING A STORAGE-STABLE SILICONE RESIN

CROSS-REFERENCE TO PRIOR APPLICATIONS

This application is a National Stage of PCT/FR2016/000054, filed Mar. 22, 2016, and designating the United States (published on Sep. 29, 2016, as WO 2016/151205 A1), which claims priority under 35 U.S.C. § 119 to French Patent Application No. 1500576, filed Mar. 24, 2015, each hereby expressly incorporated by reference in its entirety and each assigned to the assignee hereof.

The present invention lies in the field of processes for preparing silicone compounds and more particularly silicone resins.

Silicone resins are widely used in commercial products. In particular MDT silicone resins bearing hydroxyl groups are used for the waterproofing of constructions and construction materials that are porous such as stone, concrete, mortar, bricks, tiles, wood, etc. These porous materials are moisture-sensitive.

Silicone resins may be prepared by direct or inverse hydrolysis of chlorosilanes, via processes that may be continuous or discontinuous.

The term "direct hydrolysis" means herein a hydrolysis performed by adding a mixture of chlorosilanes to an aqueous medium.

The term "inverse hydrolysis" means herein a hydrolysis performed by adding an aqueous phase to a mixture of chlorosilanes.

The term "discontinuous process" or "batch process" means herein a process for which the various steps are sequenced over time.

The term "stable mixture" means herein a mixture whose kinematic viscosity does not increase on storage by more than 10% relative during a period of at least 6 months, preferably during a period of at least 12 months and even more preferentially during a period of at least 18 months.

As prior art, mention may be made of the granted patent EP-907622-B1. Thus, said patent describes an aqueous emulsion of silicone resin for the waterproofing of construction materials. A discontinuous process for preparing silicone resin by inverse hydrolysis in isopropyl ether medium is described in said document. It nevertheless has many drawbacks, namely a continuous evolution of gaseous hydrochloric acid with the need to use a device for adsorbing the gaseous hydrochloric acid, which has an economic impact and, moreover, an untimely leak of gaseous hydrochloric acid may entail serious risks for the health and safety of the operators. Furthermore, due to the solubility of isopropyl ether in water of about 45% at 20° C. in the presence of 40% hydrochloric acid, the water needs to be treated before any possible recycling, which once again has an impact on the costs. It is furthermore necessary to use an isopropyl ether that is free of olefins since olefins may react with the hydrochloric acid to form chloroalkanes, which may lead to untimely condensation of the silanol units and thus to gelation of the silicone resin. It is thus necessary to use a purified isopropyl ether, which once again has an impact on the costs.

Furthermore, due to the presence of residual hydrolyzable chlorine, this silicone resin changes on storage. Its viscosity increases sharply and rapidly.

For all these reasons, processes for preparing silicone resin must be continuously improved.

The subject of the present invention is a method for preparing by direct hydrolysis a storage-stable mixture based on silicone resin composed of monofunctional groups (M unit), difunctional units (D unit) and trifunctional units (T unit). The silicone resins have a content of hydroxyl functions, also known as oxyhydryl or oxyhydroxy functions, and a controlled molecular weight distribution. These hydroxyl functions may be borne without preference by the units D or T of the silicone resin.

It is a matter, on the one hand, of avoiding the use of an inverse hydrolysis process and thus continuous evolution of gaseous hydrochloric acid, and, on the other hand, of avoiding the use of isopropyl ether, which, as a result of its solubility, is detrimental to easy recycling of the water after hydrolysis.

It is a matter of performing a process that is simple and inexpensive since it does not require the addition of an additive such as an alcohol, a ketone, alkoxysilanes or a surfactant during the hydrolysis step.

It is a matter of avoiding gelation during the hydrolysis, processing and post-hydrolysis condensation steps.

It is also a matter of avoiding any change in the chemical and physical characteristics of the mixture based on MDT silicone resin bearing hydroxyl functions while at the same time conserving good waterproofing properties after formulation of the stable mixture based on silicone resin and use in a waterproofing coating.

The term "waterproofing coating" especially means exterior and interior paints such as water-based paints, roughcasts, varnishes, impregnations, semi-thick coatings (STCs) or paints for facades.

Thus, an essential object of the present invention is to provide a process for preparing stable mixtures based on silicone resin that is simple to perform, not requiring substantial additional industrial investments or high energy expenses relative to the known processes and which makes it possible to obtain stable mixtures based on silicone resin that can be used in waterproofing coatings for construction materials.

More specifically, the aim of the invention is also to provide stable mixtures based on silicone resins that can be used in waterproofing coatings for construction materials and can give good waterproofing properties thereto.

Another object of the invention is to provide an aqueous silicone composition comprising this stable mixture based on silicone resin.

Another object of the present invention is to obtain a paint comprising an aqueous silicone composition which itself comprises this stable mixture based on silicone resin.

Another object of the present invention is to obtain a waterproofing for porous construction materials.

All these objects, among others, are achieved by the present invention, which relates to a process for preparing a storage-stable mixture X comprising:
  i. a silicone resin R constituted of siloxyl units M, D and T with:
    M being a siloxyl unit of formula: $(Z^1)_3SiO_{1/2}$,
    D being a siloxyl unit of formula: $(Z^2)_2SiO_{2/2}$, and
    T being a siloxyl unit of formula: $Z^3SiO_{3/2}$ formulae in which the symbols $Z^1$, $Z^2$ and $Z^3$, which may be identical or different, each represent:
      a linear or branched alkyl radical containing from 1 to 8 carbon atoms, and preferably the alkyl radical is chosen from the group constituted by a methyl, an ethyl, a propyl or an octyl, and even more preferentially the radical is a methyl, a cycloalkyl radical containing from 5 to 8 carbon atoms, optionally substituted with at least one halogen, an aryl radical containing from 6 to 12 carbon atoms optionally substituted with at least one halogen, preferably a phenyl or a dichlorophenyl, a radical with an alkyl part containing from 5 to 14 carbon atoms and an aryl part containing from 6 to 12 carbon atoms optionally substituted with at least one halogen, an alkyl radical containing from 1 to 6 carbon atoms and/or an alkoxyl radical containing from 1 to 3 carbon atoms, a hydroxyl radical, a hydrogen atom, or an alkenyl radical containing from 2 to 6 carbon atoms; and with the condition that, for at least one unit D or T, at least one symbol $Z^2$ or $Z^3$ is a hydroxyl radical, and ii. at least one organic compound O containing at least one epoxy group E, said process comprising the following steps a) to g):

a) a mixture A is prepared from:
  60 to 71% by weight of a chlorosilane of formula $R^1SiCl_3$,
  15 to 25% by weight, preferably from 19 to 25% by weight, of a chlorosilane of formula $(R^2)_2SiCl_2$,
  7.5 to 20% by weight, preferably from 7.5 to 16.5% by weight, of a chlorosilane of formula $(R^3)_3SiCl$, and
  optionally an aromatic hydrocarbon AH, in which formulae the symbols $R^1$, $R^2$ and $R^3$, which may be identical or different, each represent:
  a linear or branched alkyl radical containing from 1 to 8 carbon atoms, and preferably the alkyl radical is chosen from the group constituted by a methyl, an ethyl, a propyl or an octyl, and even more preferentially the radical is a methyl,
  a cycloalkyl radical containing from 5 to 8 ring carbon atoms, optionally substituted with at least one halogen,
  an aryl radical containing from 6 to 12 carbon atoms which may be optionally substituted with at least one halogen, preferably phenyl or dichlorophenyl,
  a radical with an alkyl part containing from 5 to 14 carbon atoms and an aryl part containing from 6 to 12 carbon atoms optionally substituted with at least one halogen, an alkyl containing from 1 to 6 carbon atoms and/or an alkoxyl containing from 1 to 3 carbon atoms,
  a hydrogen atom, and
  an alkenyl radical containing from 2 to 6 carbon atoms;

b) the mixture A is added, with stirring and while maintaining a temperature of between 5 and 60° C., to a two-phase mixture B constituted of an aqueous phase and a solvent phase prepared from water, an aromatic hydrocarbon AH and optionally an aqueous solution of hydrochloric acid CA, so as to perform hydrolysis of the chlorosilanes of the mixture A, c) optionally, the stirring is maintained for at least 1 hour, preferably from 1 to 8 hours, at a temperature of between 30 and 60° C. allowing a post-hydrolysis condensation reaction, d) the stirring is stopped so as to separate an aqueous phase and a solvent phase, e) the solvent phase is isolated and washed with water, preferably until the pH of the washing waters is neutral, f) the silicone resin R is isolated from the solvent phase, preferably by devolatization, and g) at least one organic compound O containing at least one epoxy group E is added with stirring to said silicone resin R obtained in step f), allowing said mixture X to be obtained.

In this context, the process according to the invention has the following advantages:

no continuous evolution of gaseous hydrochloric acid and thus no risks to hygiene and safety for the operators or environmental risks, no formation of gel, simplification of the process by eliminating, for example, the addition of additives during the hydrolysis step and retreatment of the water prior to its recycling, and no change in the mixture based on silicone resin on storage. This means herein a mixture whose kinematic viscosity does not increase on storage during a period of at least 6 months, preferably during a period of at least 12 months and even more preferentially during a period of at least 18 months.

In silicone nomenclature, for example, to describe them, reference is made to units M, D and T. The letter M represents the monofunctional unit of formula $(CH_3)_3SiO_{1/2}$, the silicon atom being connected to only one oxygen atom in the polymer comprising this unit. The letter D means a difunctional unit $(CH_3)_2SiO_{2/2}$ in which the silicon atom is connected to two oxygen atoms. The letter T represents a trifunctional unit of formula $(CH_3)SiO_{3/2}$ in which the silicon atom is connected to three oxygen atoms. These units may be functionalized, which has the consequence of replacing one or more $CH_3$ radicals with another radical such as $Z^1$, $Z^2$ and $Z^3$ mentioned above. They are then referred to as units M, D and T while at the same time specifying the specific radicals.

Preferably, the invention relates to a process for preparing a storage-stable mixture X comprising:

i. a silicone resin R constituted of siloxyl units M, D and T with:
  M being a siloxyl unit of formula: $(Z^1)_3SiO_{1/2}$,
  D being a siloxyl unit of formula: $(Z^2)_2SiO_{2/2}$, and
  T being a siloxyl unit of formula: $Z^3SiO_{3/2}$ in which formulae the symbols $Z^1$, $Z^2$ and $Z^3$, which may be identical or different, each represent:
    a linear or branched alkyl radical containing from 1 to 8 carbon atoms, and preferably the alkyl radical is chosen from the group constituted by a methyl, an ethyl, a propyl or an octyl, and even more preferentially the radical is a methyl,
    a cycloalkyl radical containing from 5 to 8 carbon atoms, optionally substituted with at least one halogen,
    an aryl radical containing from 6 to 12 carbon atoms optionally substituted with at least one halogen, preferably a phenyl or a dichlorophenyl,
    a radical with an alkyl part containing from 5 to 14 carbon atoms and an aryl part containing from 6 to 12 carbon atoms optionally substituted with at least one halogen, an alkyl radical containing from 1 to 6 carbon atoms and/or an alkoxyl radical containing from 1 to 3 carbon atoms,
    a hydroxyl radical,
    a hydrogen atom, or an alkenyl radical containing from 2 to 6 carbon atoms; and with the condition that, for at least one unit D or T, at least one symbol $Z^2$ or $Z^3$ is a hydroxyl radical, and ii. at least one organic compound O containing at least one epoxy group E, said process comprising steps a) to g) below:

a) a mixture A is prepared from:
- 60 to 71% by weight of a chlorosilane of formula $R^1SiCl_3$,
- 15 to 25% by weight, preferably from 19 to 25% by weight, of a chlorosilane of formula $(R^2)_2SiCl_2$,
- 7.5 to 20% by weight, preferably from 7.5 to 16.5% by weight, of a chlorosilane of formula $(R^3)_3SiCl$, and
- optionally an aromatic hydrocarbon AR, in which formulae the symbols $R^1$, $R^2$ and $R^3$, which may be identical or different, each represent:
- a linear or branched alkyl radical containing from 1 to 8 carbon atoms, and preferably the alkyl radical is chosen from the group constituted by a methyl, an ethyl, a propyl or an octyl, and even more preferentially the radical is a methyl,
- a cycloalkyl radical containing from 5 to 8 ring carbon atoms, optionally substituted with at least one halogen,
- an aryl radical containing from 6 to 12 carbon atoms which may be optionally substituted with at least one halogen, preferably phenyl or dichlorophenyl,
- a radical with an alkyl part containing from 5 to 14 carbon atoms and an aryl part containing from 6 to 12 carbon atoms optionally substituted with at least one halogen, an alkyl containing from 1 to 6 carbon atoms and/or an alkoxyl containing from 1 to 3 carbon atoms,
- a hydrogen atom, and
- an alkenyl radical containing from 2 to 6 carbon atoms;

b) the mixture A is added, with stirring and while maintaining a temperature of between 5 and 60° C., to a two-phase mixture B constituted of an aqueous phase and a solvent phase prepared from water, an aromatic hydrocarbon AH and optionally an aqueous solution of hydrochloric acid CA, so as to perform hydrolysis of the chlorosilanes of the mixture A, c) the stirring is maintained for at least 1 hour, preferably from 1 to 8 hours, at a temperature of between 30 and 60° C. allowing a post-hydrolysis condensation reaction, d) the stirring is stopped so as to separate an aqueous phase and a solvent phase, e) the solvent phase is isolated and washed with water, preferably until the pH of the washing waters is neutral, f) the silicone resin R is isolated from the solvent phase, preferably by devolatization, and g) at least one organic compound O containing at least one epoxy group E is added with stirring to said silicone resin R obtained in step f), allowing said mixture X to be obtained.

The sum of the chlorosilanes of formulae $R^1SiCl_3$, $(R^2)_2SiCl_2$, and $(R^3)_3SiCl$ is 100%.

Preferably, the chlorosilanes used are trimethylchlorosilane ($Me_3SiCl$), dimethyldichlorosilane ($Me_2SiCl_2$) and methyltrichlorosilane ($MeSiCl_3$).

Preferably, in step b), the two-phase mixture B is constituted of water, an aqueous solution of hydrochloric acid CA and an aromatic hydrocarbon AH, and the hydrochloric acid concentration is less than 25% by weight relative to the total amount of water in the two-phase mixture B. The water concentration of the two-phase mixture B is such that the mass ratio of total water to water required for complete hydrolysis of the chlorosilanes is greater than 6.

At the end of addition of the chlorosilanes of step b), aromatic hydrocarbon AH may be optionally added to ensure rinsing of the installation which allows the introduction of said chlorosilanes.

Preferably, in step b), after the mixture A has been added to a two-phase mixture B, the concentration of aromatic hydrocarbon AH is between 40 and 70% by weight relative to the total weight of the chlorosilanes used and of the aromatic hydrocarbon AH, preferably between 49 and 61% by weight relative to the total weight of chlorosilanes used and of aromatic hydrocarbon AH.

Even more preferentially, the aromatic hydrocarbon AH is chosen from the group constituted of toluene, xylene and a mixture thereof.

In terms of hygiene and safety of the operators, on conclusion of step c) of maintaining the temperature, water may optionally be added to reduce the acidity of the aqueous phase.

On conclusion of step c) of maintaining the temperature, solvent AH may be optionally added to promote separation between the solvent phase and the aqueous phase.

On conclusion of step c) of maintaining the temperature, an additive may optionally be added to facilitate the separation of the aqueous phase from the solvent phase. As example of additive, mention may be made of salts, or polar solvents such as alcohols.

According to the invention, the term "organic compound O containing at least one epoxy group E" means chemical substances comprising an oxygen bridged on a carbon-carbon bond which may or may not be adjacent to a chain or a cyclic system, hereinbelow cyclic ethers. The term "epoxide" denotes a subclass of epoxy compounds comprising a three-membered cyclic ether. They are also referred to as oxacycloalkanes, more often abbreviated to oxiranes. As organic compound O containing at least one epoxy group E, mention may be made, for example, of epoxides of fatty acid esters, also known as epoxidized esters of fatty acids or epoxidized fatty acid esters, compounds or mixtures of compounds of general formula (I) below:

in which R' is a linear or branched alkyl group comprising from 1 to 16 carbon atoms, (n+x+m) is greater than or equal to 6, x is equal to 1, 2 or 3, and (n+m) is greater than or equal to 3. A process for preparing this compound or mixture of compounds is described in patent application WO 2009/138508.

Mention may be made, for example, of epoxides of alkyl oleates or epoxides of alkyl stearates. Mention may also be made of epoxides of fatty acid glycerol esters, compounds or mixtures of compounds of general formula (II) below:

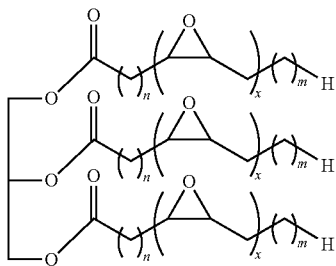 (II)

in which n, x and m are as defined above. Mention may be made, for example, of epoxidized soybean oil, epoxidized castor oil and epoxidized linseed oil.

Mention may also be made of epoxides of hexahydrophthalic acid, glycidyl n-butyl oxide (1-butoxy-2,3-epoxypropane), glycidyl tolyl oxide (1,2-epoxy-3-(tolyloxy)propane), glycidyl phenyl oxide (1,2-epoxy-3-phenoxypropane), glycidyl 2-ethylcyclohexyl oxide (1-(2-ethylcyclohexyl)-2,3-epoxypropane), 1,4-butanediol diglycidyl ether (1,4-bis(2,3-epoxypropoxy)butane), bisphenol A diglycidyl ether (2,2-bis(p-(2,3-epoxypropoxy)phenyl)propane) and neopentyl glycol diglycidyl ether (1,3-bis(2,3-epoxypropoxy)-2,2-dimethylpropane).

Preferably, the organic compound O containing at least one epoxy group E is added in step g) so that its content is between 0.1% and 1% relative to the weight of said silicone resin R and preferably between 0.1% and 0.75% relative to the weight of said silicone resin R.

Preferably, the organic compound O containing at least one epoxy group E added in step g) is an epoxidized fatty acid ester and even more preferentially the organic compound containing at least one epoxy group E added in step g) is the 2-ethylhexyl ester of epoxidized soybean fatty acids.

More particularly, to limit the presence of low molecular weight compounds which may have an impact on the content of volatile compounds and optimize the waterproofing properties of the final coating, the invention relates to a storage-stable mixture X, which may be obtained according to the process of the invention and as described above, constituted of a silicone resin R bearing hydroxyl groups and of an organic compound containing at least one epoxy group E with a kinematic viscosity according to standard ASTM D445-94 of between 300 and 25 000 mm$^2$/s and a content of hydroxyl functions measured by GPC/catharometry of between 0.2 and 4% by weight.

Assay of the hydroxyl groups is performed by GPC/catharometry from the volume of hydrogen evolved after reduction of said groups with lithium aluminum hydride according to standard NFT 75-100.

The silicone resin R has a content of M units of between 7.5 and 18%, a content of total D units of between 16 and 27% and a content of total T units of between 60 and 70%, the molar percentages being determined by $^{29}$Si NMR. The term "total D units" means herein the units D and $D^{OH}$. The term "total T units" means herein the units T and $T^{OH}$.

Another subject of the invention relates to an aqueous silicone dispersion Y characterized in that it comprises:
at least one mixture X according to the invention and as described above,
at least one surfactant S, and
water W.

Preferably, this aqueous dispersion is in the form of an oil-in-water emulsion.

When the surfactant S is used in the dispersion according to the invention, it is preferably a nonionic surfactant.

In the context of the present invention, anionic surfactants may optionally be used. By way of example, mention may be made of alkali metal salts of aromatic sulfonic or alkyl sulfuric hydrocarbon-based acids and the preferred nonionic surfactants are polyoxyethylenated fatty alcohols.

The amount of surfactant that may be used is that commonly used for emulsification as described in particular in U.S. Pat. No. 2,891,920.

The nonionic (preferably), ionic or amphoteric surfactants may be used alone or as a mutual mixture.

In practice, the dispersion according to the invention comprises from 30 to 90%, preferably from 30 to 60%, by weight of water per 70 to 10%, preferably 70 to 40%, by weight of nonaqueous phase.

Another subject of the invention relates to an aqueous formulation F, which may be used especially in the formulation of paints, comprising
an aqueous silicone dispersion Y, according to the invention and as described above, said silicone dispersion preferably being present at up to 150% by weight relative to the total weight of one or more organic dispersions (binder(s)) and even more preferentially between 40 and 100% by weight;
a siliceous or nonsiliceous filler, preferably chosen from the group constituted by: precipitated silica, fumed silica, colloidal silica or silica powder, carbonates, talc, $TiO_2$, and mixtures thereof;
one or more organic dispersions (binder(s)), preferably chosen from those comprising (co)polymers of styrene and/or (meth)acrylic acid; and
at least one of the compounds chosen from the group constituted by:
a thickener chosen from the group constituted by acrylic cellulose-based thickeners, polyurethanes, natural gums, and mixtures thereof;
a coalescer preferably chosen from organic solvents and even more preferentially from glycols and/or aliphatic petroleum fractions;
a wetting agent or dispersant preferably chosen from phosphates and/or polyacrylics;
a surfactant;
a neutralizing agent;
a biocide;
a diluent;
a plasticizer, preferably chosen from nonreactive silicone oils;
an antifoam; and
a pigment or colorant (organic or mineral).

The term "organic dispersion" or "binder" means herein a latex of organic polymers originating from the (co)polymerization:
of at least one vinyl monomer chosen from the group constituted by: styrene, o-methylstyrene and a vinyltoluene;
at least one alkyl (meth)acrylate monomer; and
optionally at least one ethylenic unsaturated mono- or dicarboxylic acid monomer.

Another subject of the invention relates to paints P characterized in that they comprise the aqueous silicone dispersion Y or of the aqueous formulation F according to the invention and as described above.

Another subject of the invention relates to the use of the aqueous silicone dispersion Y or of the aqueous formulation F according to the invention and as described above, in the field of paints.

The paint according to the invention may be applied, for example, to facades according to the usual techniques. By way of example, it may be applied to surfaces via any suitable means such as a fine brush, a coarse brush, a spray gun, etc. The surfaces onto which the coating composition according to the invention may be applied are of diverse nature: for example metal such as aluminum, wood, cement, brick with or without precoating with an adhesion primer.

Another subject of the invention relates to the use for impregnating a porous construction material of a nonaqueous waterproofing composition which is a liquid silicone composition L comprising at least one mixture X according to the invention and as described above.

According to one embodiment of the invention, the liquid silicone composition L comprises
a) at least one mixture X according to the invention and as described above,
b) at least one metal alkoxide MA of general formula (III):

  (III)

in which:
V is a metal chosen from the group formed by: Ti, Zr, Ge, Mn and Al;
n=valency of V;
the substituents $R^5$, which may be identical or different, each represent a linear or branched $C_1$ to $C_{12}$ alkyl radical;
a is equal to zero, 1 or 2;
with the conditions according to which, when the symbol a is equal to zero, the alkyl radical $R^5$ contains from 2 to 12 carbon atoms, and when the symbol a is equal to 1 or 2, the alkyl radical $R^5$ contains from 1 to 4 carbon atoms; and
c) at least one crosslinking agent C of general formula (IV):

  (IV)

in which:
the substituents R, which may be identical or different, each represent a linear or branched $C_1$ to $C_{12}$ alkyl radical, and
a is equal to 0, 1 or 2.

The amount of metal alkoxide MA that may be used is ≥5% by weight, preferably ≥6% by weight and even more preferentially ≥7% by weight relative to the mixture X.

The amount of crosslinking agent C that may be used is ≥4% by weight, preferably ≥5% by weight and even more preferentially ≥6% by weight relative to the mixture X.

Another subject of the invention relates to a process for waterproofing porous construction materials, in which the above said nonaqueous liquid silicone composition L as described above is applied to said material.

A final subject according to the invention relates to a process in which the above said nonaqueous liquid silicone composition L is applied to a porous material which is chosen from the following substrates: stone, concrete, mortar, brick, tile and wood.

The examples and tests that follow are given as nonlimiting illustrations. They especially make it possible to understand the invention more clearly and to bring forth all its advantages and to envisage a number of implementation variants.

EXAMPLES

A) Starting Materials Used:
Trimethylchlorosilane from the company Sigma-Aldrich.
Dimethyldichlorosilane from the company Sigma-Aldrich.
Methyltrichlorosilane from the company Sigma-Aldrich.
Demineralized water.
AH: Normapur-grade toluene from the company VWR International.
CA: aqueous hydrochloric acid solution from the company VWR International (~37 or 33% by weight).
Organic compound O: Dehysol® B35 from the company BTC: 2-ethylhexyl ester of epoxidized fatty acids (CAS 68082-34-8).

For all the examples, the term "neutral pH" means a pH of 7 (pH paper precision).

B) Preparation of Mixtures X According to the Invention

1. Mixture X1 According to the Invention

According to a direct hydrolysis process, a mixture of chlorosilanes, composed of 4.38 g of trimethylchloro-silane, 8.55 g of dimethyldichlorosilane and 26.95 g of methyltrichlorosilane is added under a stream of argon dropwise to a stirred reactor containing beforehand 43 g of toluene AH, 43.3 g of water and 18.9 g of a hydrochloric acid solution CA at 37% by weight (direct process). The temperature of the reaction medium is maintained between 5 and 60° C. At the end of the addition, 7 g of toluene AH are added and the temperature of the reaction medium is then maintained at 50° C. for 1 hour. On conclusion of the temperature maintenance, the reaction medium is cooled to 30° C. and 100 g of water are then added slowly so as to reduce the hydrochloric acid concentration of the aqueous phase. Once the stirring is stopped, the reaction medium separates into two phases. The aqueous phase is withdrawn and the organic phase is washed with water until the pH of the washing waters is neutral. The solvent of the organic phase is evaporated off at 60° C. under a pressure of less than 5 mbar for 2 hours. 17.6 g of silicone resin R1 are obtained, with a kinematic viscosity of 1209 mm²/s and a content of hydroxyl functions of 0.8% by weight, and to which is added 0.035 g of Dehysol® B35, organic compound O, so as to obtain the mixture X1.

$^{29}$Si NMR analysis of the mixture X1 reveals the following distribution:

| UNITS | mol % relative to silicon |
|---|---|
| M | 10.88 |
| D(OH) | 0.70 |
| D | 22.72 |
| T(OH) | 7.86 |
| T | 57.84 |

The mixture X1 obtained according to a direct rather than an inverse hydrolysis process, in the absence of isopropyl ether during the direct hydrolysis step b) and containing organic compound O added during step g) of the process, has a stability for the purposes of the invention of greater than 6 months, i.e. the kinematic viscosity of the mixture X1 does not increase on storage by more than 10% relative.

2. Mixture X2 According to the Invention

The preparation of the mixture X2 is similar to that of the mixture X1 with the exception of the duration of the steady stage at 50° C., which is 4 hours instead of one hour. On conclusion of the distillation of the solvent, 18.1 g of silicone resin R2 are obtained, to which is added 0.036 g of Dehysol® B35, organic compound O, so as to obtain the mixture X2 which has a kinematic viscosity of 1404 mm²/s and a content of hydroxyl functions of 0.6% by weight.

$^{29}$Si NMR analysis of the mixture X2 reveals the following distribution:

| UNITS | mol % relative to silicon |
|---|---|
| M | 11.3 |
| D(OH) | 0.70 |
| D | 23.3 |
| T(OH) | 8.3 |
| T | 56.4 |

The mixture X2 obtained according to a direct rather than an inverse hydrolysis process, in the absence of isopropyl ether during the direct hydrolysis step b) and containing organic compound O added during step g) of the process, has a stability within the meaning of the invention of greater than 6 months, i.e. the kinematic viscosity of the mixture X2 does not increase on storage by more than 10% relative.

3. Mixture X3 According to the Invention

The preparation of the mixture X3 is similar to the mixture X1 with the exception of the amounts of water and of hydrochloric acid at 37% by weight CA initially present in the reactor before adding the mixture of chlorosilanes, which are, respectively, 31.7 g and 37.3 g. On conclusion of the distillation of the solvent, 18 g of silicone resin X3 are obtained, to which is added 0.036 g of Dehysol® B35, organic compound O, so as to obtain the mixture X3 which has a kinematic viscosity of 979 mm$^2$/s and a content of hydroxyl functions of 0.83% by weight.

$^{29}$Si NMR analysis of the mixture X3 reveals the following distribution:

| UNITS | mol % relative to silicon |
|---|---|
| M | 10.5 |
| D(OH) | — |
| D | 25.5 |
| T(OH) | 4.7 |
| T | 59.3 |

The mixture X3 obtained according to a direct rather than an inverse hydrolysis process, in the absence of isopropyl ether during the direct hydrolysis step b) and containing organic compound O added during step g) of the process, has a stability within the meaning of the invention of greater than 6 months, i.e. the kinematic viscosity of the mixture X3 does not increase on storage by more than 10% relative.

4. Mixture X4 According to the Invention

The preparation of the mixture X4 is similar to the mixture X1 with the exception of the mixture of chlorosilanes, which is composed of 3.01 g of trimethylchlorosilane, 8.9 g of dimethyldichlorosilane and 28 g of methyltrichlorosilane. On conclusion of the distillation of the solvent, 17.6 g of silicone resin R4 are obtained, to which is added 0.035 g of Dehysol® B35, organic compound O, so as to obtain the mixture X4 which has a kinematic viscosity of 12 319 mm$^2$/s and a content of hydroxyl functions of 1.05% by weight.

$^{29}$Si NMR analysis reveals the following distribution:

| UNITS | mol % relative to silicon |
|---|---|
| M | 7.6 |
| D(OH) | — |
| D | 23.6 |
| T(OH) | 12.0 |
| T | 56.0 |

The mixture X4 obtained according to a direct rather than an inverse hydrolysis process, in the absence of isopropyl ether during the direct hydrolysis step b) and containing organic compound O added during step g) of the process, has a stability within the meaning of the invention of greater than 6 months, i.e. the kinematic viscosity of the mixture X4 does not increase on storage by more than 10% relative.

5. Mixture X5 According to the Invention

The preparation of the mixture X5 is similar to the mixture X1 with the exception of the mixture of chlorosilanes, which is composed of 5.99 g of trimethylchlorosilane, 8.16 g of dimethyldichlorosilane and 25.72 g of methyltrichlorosilane. On conclusion of the distillation of the solvent, 18.3 g of silicone resin R5 are obtained, to which is added 0.036 g of Dehysol® B35, organic compound O, so as to obtain the mixture X5 which has a kinematic viscosity of 300 mm$^2$/s and a content of hydroxyl functions of 0.95% by weight.

$^{29}$Si NMR analysis reveals the following distribution:

| UNITS | mol % relative to silicon |
|---|---|
| M | 14.7 |
| D(OH) | 0.52 |
| D | 21.2 |
| T(OH) | 9.2 |
| T | 54.4 |

The mixture X5 obtained according to a direct rather than an inverse hydrolysis process, in the absence of isopropyl ether during the direct hydrolysis step b) and containing organic compound O added during step g) of the process, has a stability within the meaning of the invention of greater than 6 months, i.e. the kinematic viscosity of the mixture X5 does not increase on storage by more than 10% relative.

6. Mixture X6 According to the Invention

A mixture of chlorosilanes constituted of 174 g of trimethylchlorosilane, 339 g of dimethyldichlorosilane and 1069 g of methyltrichlorosilane is added slowly to a stirred 10-liter reactor containing 1800 g of water and 1800 g of toluene AH. The temperature of the reaction medium is maintained between 5 and 60° C.

At the end of addition of the chlorosilanes, the temperature of the reaction medium is maintained at 50° C. for 1 hour. On conclusion of the temperature maintenance, 200 g of toluene and 3000 g of water are added to the preceding mixture. After separation of the phases by settling, withdrawal of the aqueous phase and washing of the organic phase until a neutral pH is obtained, the solvent of the organic phase is evaporated off at 60° C. under a pressure of less than 5 mbar for 8 hours. After 8 hours of devolatization, 0.2% of Dehysol® B35, organic compound O, is added to the silicone resin R6 obtained. The mixture X6 thus obtained has a kinematic viscosity of 1270 mm$^2$/s and a content of hydroxyl functions of 0.64% by weight.

The mixture X6 obtained according to a direct rather than an inverse hydrolysis process, in the absence of isopropyl ether during the direct hydrolysis step b) and containing organic compound O added during step g) of the process, has a stability within the meaning of the invention of greater than 6 months, i.e. the kinematic viscosity of the mixture X6 does not increase on storage by more than 10% relative.

C) Preparation of the Comparative Examples

1. Comparative Test 1

The preparation of comparative test 1 is similar to the mixture X1 except for the fact that the toluene is replaced with isopropyl ether. On conclusion of the distillation of the solvent, 19 g of silicone resin are obtained, with a kinematic viscosity of 150 mm$^2$/s and comprising 0.54% by weight of hydroxyl units, outside the target in terms of viscosity, i.e. the viscosity is not between outside the target in terms of viscosity, i.e. the viscosity is not between 300 and 25 000 mm$^2$/s. All the factors being otherwise equal, the use of isopropyl ether as replacement for toluene does not make it possible to obtain a resin in accordance with the invention.

2. Comparative Test 2

A mixture of chlorosilanes, composed of 8.57 g of dimethyldichlorosilane and 26.95 g of methyl-trichlorosilane, is added under a stream of argon dropwise to a stirred reactor containing 38.4 g of toluene, 38.7 g of water and 16.8 g of a hydrochloric acid solution at 37% by weight. The temperature of the reaction medium is maintained between 5 and 60° C. At the end of the addition, 6.2 g of toluene are added, and the temperature of the reaction medium is then maintained at 50° C. for 1 hour. On conclusion of the temperature maintenance, the reaction medium is cooled to 30° C. and 100 g of water are then added slowly so as to reduce the hydrochloric acid concentration of the aqueous phase. On stoppage of the stirring, no phase separation takes place and white solid is abundantly present on the walls. The absence of trimethylchlorosilane in the mixture A does not make it possible to obtain a resin as defined according to the invention. The inventor has, to his credit, identified the correct concentration range of the trimethylchlorosilane in the mixture A.

3. Comparative Test 3

A mixture of chlorosilanes, composed of 2.05 g of trimethylchlorosilane, 9.10 g of dimethyldichlorosilane and 28.80 g of methyltrichlorosilane, is added under a stream of argon dropwise to a stirred reactor containing 43 g of toluene, 43.3 g of water and 18.9 g of a hydrochloric acid solution at 37% by weight. The temperature of the reaction medium is maintained between 5 and 60° C. At the end of the addition, 7 g of toluene are added, and the temperature of the reaction medium is then maintained at 50° C. for 1 h. On conclusion of the temperature maintenance, the reaction medium is cooled to 30° C. and 100 g of water are then added slowly so as to reduce the hydrochloric acid concentration of the aqueous phase. On stoppage of the stirring, the reaction medium cannot be separated since it is heterogeneous: presence of solid gels. The presence of 5% of trimethylchlorosilane in the mixture A is not sufficient to prevent the formation of gels. The inventor has, to his credit, identified the correct concentration range of trimethylchlorosilane in the mixture A.

4. Comparative Test 4

A mixture of chlorosilanes, composed of 2.02 g of trimethylchlorosilane, 9.10 g of dimethyldichlorosilane and 28.80 g of methyltrichlorosilane, is added under a stream of argon dropwise to a stirred reactor containing 43 g of toluene, 31.7 g of water and 37.3 g of a hydrochloric acid solution at 37% by weight. The temperature of the reaction medium is maintained between 5 and 60° C. At the end of the addition, 7 g of toluene are added, and the temperature of the reaction medium is then maintained at 50° C. for 1 hour. On conclusion of the temperature maintenance, the reaction medium is cooled to 30° C. and 100 g of water are then added slowly so as to reduce the hydrochloric acid concentration of the aqueous phase. On stoppage of the stirring, the reaction medium separates into two phases. The aqueous phase is withdrawn, but the medium is heterogeneous: presence of solid gels in the organic phase. The presence of 5% of trimethylchlorosilane in the mixture A is not sufficient to prevent the formation of gels, even in the presence of an amount of 37% hydrochloric acid solution that is larger than in comparative test 3. The inventor has, to his credit, identified the correct concentration range of trimethylchlorosilane in the mixture A.

5. Comparative Test 5

A mixture of chlorosilanes, composed of 12.03 g of trimethylchlorosilane, 6.77 g of dimethyldichlorosilane and 21.18 g of methyltrichlorosilane, is added under a stream of argon dropwise to a stirred reactor containing 43 g of toluene, 43.3 g of water and 18.9 g of hydrochloric acid solution at 37% by weight. The temperature of the reaction medium is maintained between 5 and 60° C. At the end of the addition, 7 g of toluene are added, and the temperature of the reaction medium is then maintained at 50° C. for 1 hour. On conclusion of the temperature maintenance, the reaction medium is cooled to 30° C. and 100 g of water are then added slowly so as to reduce the hydrochloric acid concentration of the aqueous phase. On stoppage of the stirring, the reaction medium separates into two phases. The aqueous phase is withdrawn and the organic phase washed with water until the pH of the washing waters is neutral. The solvent of the organic phase is evaporated off at 60° C. under a pressure of less than 5 mbar for 2 hours. 18.8 g of silicone resin are obtained, with a viscosity of 23 mm$^2$/s and comprising 0.8% by weight of hydroxyl functions, outside the target in terms of viscosity, i.e. the viscosity is not between 300 and 25 000 mm$^2$/s.

The presence of 30% of trimethylchlorosilane in the mixture A does not make it possible to obtain a resin as defined according to the invention. The inventor has, to his credit, identified the correct concentration range of trimethylchlorosilane in the mixture A.

D) Influence of Dehysol® B35, Organic Compound O, on the Stability of the Mixture X 1. Mixtures X7 and X7bis According to the Invention Via a direct hydrolysis process, a mixture of chlorosilanes constituted of 174 g of trimethylchlorosilane, 339 g of dimethyldichlorosilane and 1069 g of methyltrichlorosilane is added slowly to a stirred 10-liter reactor containing 1718 g of water, 750 g of 33% hydrochloric acid CA and 1706 g of toluene AH. The temperature of the reaction medium is maintained between 5 and 60° C.

278 g of toluene are added at the end of addition of the chlorosilanes.

The temperature of the reaction medium is then maintained at 50° C. for 1 hour.

On conclusion of the temperature maintenance, the reaction medium is cooled to 30° C. and 3967 g of water are added to the preceding mixture.

After separation of the phases by settling, withdrawal of the aqueous phase and washing of the organic phase until a neutral pH is obtained, the solvent of the organic phase is evaporated off at 60° C. under a pressure of less than 5 mbar for 2 to 5 hours.

a) After two hours of devolatilization, a sample is taken.

The silicone resin R7 obtained from this sample has a kinematic viscosity of 1938 mm$^2$/s and a content of hydroxyl functions of 0.52%.

0.2% by weight of Dehysol® B35, organic compound O, is added to part of the silicone resin. The mixture X7 is thus obtained.

The other part is kept without addition of Dehysol® B35, organic compound O.

Monitoring of the viscosity of the two parts over time shows the absence of increase in the presence of Dehysol® B35, organic compound O.

The organic compound O thus makes it possible to stabilize the resin according to the invention, i.e. the kinematic viscosity of the mixture X7 does not increase on storage by more than 10% relative.

On the other hand, the part without Dehysol® B35, i.e. without the organic compound O, has a kinematic viscosity that is multiplied by 1.85 over 6 months of storage.

The resin in the absence of the organic compound O is not stable on storage.

The addition of the organic compound O is necessary for the stability of the resin which may optionally be emulsified.

b) In parallel to the sampling, devolatilization is continued. After five hours of devolatilization, 0.2% of Dehysol® B35, organic compound O, is added to the silicone resin R7bis obtained. The mixture X7bis thus obtained has a kinematic viscosity of 1860 mm$^2$/s and a content of hydroxyl functions of 0.59% by weight.

2. Mixtures X8 and X9 According to the Invention

Via a direct hydrolysis process, a mixture of chlorosilanes constituted of 174 g of trimethylchlorosilane, 339 g of dimethyldichlorosilane and 1069 g of methyltrichlorosilane is added slowly to a stirred 10-liter reactor containing 3345 g of water, 1647 g of 33% hydrochloric acid CA and 1706 g of toluene AH. The temperature of the reaction medium is maintained between 5 and 60° C.

278 g of toluene are added at the end of addition of the chlorosilanes.

The temperature of the reaction medium is then maintained at 50° C. for 1 hour.

On conclusion of the temperature maintenance, the reaction medium is cooled to 30° C., 2000 g of water are added to the preceding mixture.

After separation of the phases by settling, withdrawal of the aqueous phase and washing of the organic phase until a neutral pH is obtained, the solvent of the organic phase is evaporated off at 60° C. under a pressure of less than 5 mbar for 2 to 5 hours 30 minutes.

a) After two hours of devolatilization, a sample is taken. 0.2% of Dehysol® B35, organic compound O, is added to the silicone resin R8 obtained. The mixture X8 thus obtained has a content of hydroxyl functions of 0.19% by weight and a viscosity of 5485 mm$^2$/s which does not increase on storage.

The organic compound O thus makes it possible to stabilize the resin according to the invention, i.e. the kinematic viscosity of the mixture X8 does not increase on storage by more than 10% relative.

b) In parallel to the sampling, devolatilization is continued. After five hours 30 minutes of devolatilization, 0.2% of Dehysol® B35, organic compound O, is added to the silicone resin R9 obtained. The mixture X9 thus obtained has a viscosity of 3487 mm$^2$/s and a content of hydroxyl functions of 0.21% by weight.

E) Preparation of Emulsions

1. Starting Materials Used

Mixture X of silicone resin R and of an organic compound O containing at least one epoxy group E according to the invention.

Water-soluble hydroxylated alkylamino silane: aqueous hydrolyzate of gamma-aminopropyltriethoxysilane containing 20% active material, from which the alcohol has been removed by stripping (commercial product Silquest® VS142 from Momentive)

Silane bearing alkoxy group: OTES=octyltriethoxysilane from Sigma-Aldrich

Surfactants S: an ethoxylated (8 ethoxy units) fatty alcohol (chain of 13 carbons), sold under the name ROX® by the company Solvay 2. Mixture X10 According to the Invention Via a direct hydrolysis process, a mixture of chlorosilanes constituted of 174 g of trimethylchlorosilane, 339 g of dimethyldichlorosilane and 1069 g of methyltrichlorosilane is added slowly to a stirred 10-liter reactor containing 1800 g of water, 670 g of hydrochloric acid at 37% by weight CA and 1706 g of toluene AH. The temperature of the reaction medium is maintained between 5 and 60° C.

278 g of toluene are added at the end of addition of the chlorosilanes.

The temperature of the reaction medium is then maintained at 50° C. for 1 hour.

On conclusion of the temperature maintenance, the reaction medium is cooled to 30° C. and 3967 g of water are added to the preceding mixture.

After separation of the phases by settling, withdrawal of the aqueous phase and washing of the organic phase until a neutral pH is obtained, the solvent of the organic phase is evaporated off at 60° C. under a pressure of less than 5 mbar for 8 hours. After 8 hours of devolatilization, 0.2% of Dehysol® B35, organic compound O, is added to the silicone resin obtained. The mixture X10 thus obtained has a viscosity of 1019 mm$^2$/s and a content of hydroxyl functions of 0.49% by weight.

3. Process for Preparing Aqueous Dispersions Y

Several protocols for preparing aqueous dispersions Y may be envisaged. Without this being limiting, the protocol retained in the present example is that consisting in:

1) Mixing 15.8 g of water and 25.3 g of surfactant S in a 1 L tank equipped with a rotary anchor 2) Incorporating, into this mixture of water and surfactant S, 342.8 g of the mixture X and then 14.5 g of silane OTES, this incorporation being performed gradually and under stirring of about 100 rpm so as to obtain an oil-in-water emulsion.

3) Performing a post-addition of 14.5 g of water-soluble silane Silquest VS142 and continuing the stirring for about 1 hour.

4) Adding 184.6 g of water to dilute the emulsion to the desired active material content.

A liquid of white appearance is thus obtained, the volume-mean diameter of which, determined by laser particle size analysis using a Mastersizer 2000 machine (Malvern), is given below for 3 different silicone resins.

| Emulsion | Y1 | Y2 | Y3 |
| --- | --- | --- | --- |
| Mixture X emulsified | X9 | X10 | X7bis |
| Content of OH (% by weight) of the mixture X according to the invention | 0.21% | 0.49% | 0.59% |
| Viscosity of the mixture X according to the invention | 3487 mm$^2$/s | 1019 mm$^2$/s | 1860 mm$^2$/s |
| D[4,3] of the emulsion | 0.197 μm | 0.179 μm | 0.201 μm |

The particle size of the emulsion is measured by laser scattering using a MasterSizer 2000-Hydro 2000G particle size analyzer according to standard ISO 13320 (2009).

F) Formulation of Paints

In order to evaluate the provision of the emulsions Y of mixtures X on the final properties of the paint, two types of paint are prepared. One P1 has VPC/CVCP ratio of 1.13 and the other P2 has a VPC/CVPC ratio of 0.80. Their compositions are given in the table below.

The critical volume-based pigment concentration CVPC is the value of the volume-based pigment concentration for which the binder very exactly fills the volume left available between the particles of pulverulent material assumed to be in contact and above which certain properties of the film are appreciably modified.

The volume-based pigment concentration VPC is the ratio, expressed as a percentage, of the total volume of pigments and/or filler materials and/or other solid particles not forming a film, contained in a product, to the total volume of nonvolatile materials.

The constituents and composition of the paints are as follows:

| Constituent | Supplier | Function/ chemical nature | Mass (g) per 100 g of paint of VPC/ CVPC = 1.13 P1 | Mass (g) per 100 g of paint of VPC/ CVPC = 0.8 P2 |
| --- | --- | --- | --- | --- |
| Water | | | 26.2 | 24.3 |
| Ecodis ™ P90 | Coatex | Dispersant | 0.5 | 0.5 |
| BYK$^R$ 037 | BYK | Antifoam | 0.2 | 0.2 |
| Tiona$^R$ 595 | Cristal | TiO$_2$ pigment | 14 | 12.2 |
| Durcal$^R$ 5 | Omya | Calcium carbonate | 25 | 19.2 |
| Calibrite$^R$ SL | Omya | Calcium carbonate | 11 | 8.3 |
| Talc Luzenac$^R$ 10MO | Imerys | Talc | 6 | 4.4 |
| Craymul$^R$ 2423 | Cray Valley | Acrylic styrene | 9.2 | 17.6 |
| Emulsion Y1 or Y2 or Y3 | According to the invention | Silicone emulsion | 5.6 | 10.7 |
| Dowanol$^{RM}$ DPnB | Dow Chemicals | Coalescence agent | 0.3 | 0.7 |
| BYK$^R$ E420 | BYK | Thickener | 0.4 | 0.4 |
| Coapur ™ 830W | Coatex | Polyurethane thickener | 1.3 | 1.3 |
| Acticide$^R$ MBS | Thor | Biocide | 0.3 | 0.3 |

1. Wet Abrasion Resistance (WAR) Test

A paint for interior or exterior application must be able to be cleaned easily without being degraded. For this type of product, the binding power of the polymer, i.e. its ability to ensure cohesion of the assembly, is a deciding factor.

One means for quantifying this property consists in evaluating the wet abrasion resistance of a paint.

Definitions of the Wet Abrasion Resistance

According to standard ISO 11998, the wet abrasion resistance is equal to the loss of thickness of a film of paint after a defined abrasion cycle performed using a standardized machine.

Principle

It is a matter of evaluating the ability of a film of paint of defined thickness to withstand the abrasive action exerted by the to-and-fro movement of a brush or an abrasive pad, in aqueous medium.

Expressing the Results

For Standard ISO 19988

For each test specimen, apply the following formula: $\Delta_m * 10^6 / (39 * 387 * d_s)$ in which:

$\Delta_m$ is the weight difference of the test specimens before and after the test, $d_s$ is the dry density of the paint.

For each paint, calculate the mean and the standard deviation.

Express the result in μm, which corresponds to a loss of thickness of the film of paint. A classification of paints as a function of the loss of thickness and of the number of abrasion cycles exists:

Class 1: <5 μm at 200 abrasion cycles, for paints with a high binder content.

Class 2: ≥5 μm and <20 μm at 200 abrasion cycles, the paint is scrubbable.

Class 3: ≥20 μm and <70 μm at 200 abrasion cycles, the paint is washable.

Class 4: <70 μm at 40 abrasion cycles

Class 5: ≥70 μm at 40 abrasion cycles.

2. Water Permeability (W24)

The procedure (standard NF EN 1062-3, February 1999) specifies a method for determining the permeability to liquid water of paint products and of similar products, applied to exterior masonry and concrete. This method is applicable to paint products and coating systems for porous supports, for instance: bricks, concrete and renderings.

Principle

Coatings for exterior masonry and concrete play an important role for preventing the penetration of runoff water into porous mineral supports. This criterion is evaluated by means of mineral blocks of high porosity, one of the faces of which is coated with the coating or the coating system. The test specimen is immersed in water, under given conditions, and the test specimens are weighed at regular time intervals. The permeability to liquid water is determined by the change in mass when the change in mass is directly proportional to the square root of the time interval.

Expressing the Results

Determine the increase in the mass of water as being the function of the square root of time. The slope of the linear part of the curve is the coefficient of the transmission of liquid water W in kg/m$^2$·√t of hours. To obtain the coefficient W, it is necessary to divide the increase in mass by the surface area, in m$^2$, or to divide the slope by the surface area. The surface area will be the surface area not covered with paraffin. Normally, W is calculated for a period of 24 hours. If the part of the curve is obtained before 24 hours, the number of hours must be indicated as the W index (e.g. W6).

3. Steam Permeability Sd

The procedure makes it possible, according to standard NF EN ISO 7783-2, to determine the capacity of a film of paint to allow steam to pass through.

The paint is applied to a porous polyethylene plaque 250 μm thick. After several washing/drying cycles, the coated plaques are cut up and placed on crucibles containing 150 mL of a saturated ammonium dihydrogen phosphate solution. From the measured loss of mass, the "Sd" factor is determined, corresponding to the thickness (in meters) of the layer of air at rest allowing a stream of steam equivalent to the stream observed through the paint film.

4. Results of the Evaluation of the Paints:

| Aqueous dispersion used in the paint type P1 or P2 | Paint type P1 VPC/CVPC = 1.13 | | Paint type P2 VPC/CVPC = 0.8 |
|---|---|---|---|
| | WAR (μm) | W24 (kg/m² · h$^{0.5}$) | Sd (m) |
| Emulsion Y1 | 12.5 | 0.10 | 0.12 |
| Emulsion Y2 | 11.5 | 0.10 | 0.06 |
| Emulsion Y3 | 14.5 | 0.10 | 0.02 |

These paints have satisfactory performance qualities, corresponding to the following classification according to the standards mentioned above: class 2 for the WAR (between 5 and 20 μm), class 3 for W24 (≤0.10 kg/m²·h$^{0.5}$) and class 1 for Sd (<0.14 m).

G) Use of a Nonaqueous Liquid Silicone Composition L as Waterproofing for Porous Construction Materials 1. Starting Materials Used Mixture X of silicone resin R and of an organic compound O containing at least one epoxy group E according to the invention.

Butyl titanate MA Ti(OBu)$_4$ from the company Dorf Ketal Specialty Catalysts LLC (USA)

Ethyl silicate C Si(OEt)$_4$ from the company Bluestar Silicones

White spirit from the company Quimidroga S.A. (Spain)

2. Formulation of the Nonaqueous Silicone Composition L1

Several protocols for preparing the nonaqueous liquid silicone composition L may be envisaged. Without this being limiting, the protocol selected in the present example is that consisting in introducing and homogenizing in a 150 mL beaker 4.2 g of mixture X8 according to the invention, 0.32 g of butyl titanate, 0.22 g of ethyl silicate and 71.4 g of white spirit. The nonaqueous silicone composition L1 is obtained.

3. Treatment of Stones

After homogenization, the nonaqueous silicone composition L1 is used for the following treatments:

3 stones (in this instance Savonnières stones) are treated by dipping in the solution for a time of 2 times 10 seconds with an interval of one minute.

The stones are left to dry for 15 days at 23° C. under an atmosphere at 50% relative humidity.

4. Evaluation of the Waterproofing

The waterproofing is then evaluated by capillarity water uptake: the treated stones are placed in contact with the water and are then weighed regularly. A mean is taken on the 3 stones, and the decrease in water absorption is determined by normalizing the water uptake of the samples with that of an untreated control. After 28 days of contact with water, a 90% decrease in water absorption is then obtained, reflecting good waterproofing efficiency of the treated stones.

The invention claimed is:

1. A process for preparing a storage-stable mixture X comprising a silicone resin R, the process comprising the steps:

a) preparing a mixture A from:
60 to 71% by weight of a chlorosilane of formula R$^1$SiCl$_3$,
15 to 25% by weight of a chlorosilane of formula (R$^2$)$_2$SiCl$_2$,
7.5 to 20% by weight of a chlorosilane of formula (R$^3$)$_3$SiCl, and
optionally an aromatic hydrocarbon AH,
in which formulae the symbols R$^1$, R$^2$, and R$^3$, which are identical or different, each represent:
a linear or branched alkyl radical containing from 1 to 8 carbon atoms,
a cycloalkyl radical containing from 5 to 8 ring carbon atoms, optionally substituted with at least one halogen,
an aryl radical containing from 6 to 12 carbon atoms which is optionally substituted with at least one halogen,
a radical with an alkyl part containing from 5 to 14 carbon atoms and an aryl part containing from 6 to 12 carbon atoms optionally substituted with at least one halogen, an alkyl containing from 1 to 6 carbon atoms and/or an alkoxyl containing from 1 to 3 carbon atoms,
a hydrogen atom, and
an alkenyl radical containing from 2 to 6 carbon atoms;

b) performing hydrolysis of the chlorosilanes of the mixture A to form the silicone resin R by adding the mixture A with stirring and while maintaining a temperature of between 5° C. and 60° C., to a two-phase mixture B comprised of an aqueous phase and a solvent phase, wherein the mixture B comprises water, an aromatic hydrocarbon AH and optionally an aqueous solution of hydrochloric acid CA;

c) optionally maintaining the stirring for at least 1 hour at a temperature of between 30° C. and 60° C. allowing a post-hydrolysis condensation reaction;

d) stopping the stirring to separate an aqueous phase and a solvent phase;

e) isolating and washing the solvent phase with water;

f) isolating the silicone resin R from the solvent phase; and g) adding at least one organic compound O containing at least one epoxy group E which is an epoxidized fatty acid ester with stirring to the silicone resin R obtained in step f), and obtaining the mixture X;

wherein the resulting mixture X comprises:

i. the silicone resin R comprised of siloxyl units M, D and T with:
M being a siloxyl unit of formula: (Z$^1$)$_3$SiO$_{1/2}$,
D being a siloxyl unit of formula: (Z$^2$)$_2$SiO$_{2/2}$, and
T being a siloxyl unit of formula: Z$^3$SiO$_3$,
formulae in which the symbols Z$^1$, Z$^2$, and Z$^3$, are identical or different, each represent:
a linear or branched alkyl radical containing from 1 to 8 carbon atoms,
a cycloalkyl radical containing from 5 to 8 carbon atoms, optionally substituted with at least one halogen,
an aryl radical containing from 6 to 12 carbon atoms, optionally substituted with at least one halogen,
a radical with an alkyl part containing from 5 to 14 carbon atoms and an aryl part containing from 6 to 12 carbon atoms optionally substituted with at least one halogen, an alkyl radical containing from 1 to 6 carbon atoms and/or an alkoxyl radical containing from 1 to 3 carbon atoms,
a hydroxyl radical,
a hydrogen atom, or
an alkenyl radical containing from 2 to 6 carbon atoms; and with the condition that, for at least one unit D or T, at least one symbol $Z^2$ or $Z^3$ is a hydroxyl radical, and
ii. at least one organic compound O containing at least one epoxy group E.

2. The process as claimed in claim 1, in which, in step a), the mixture A is prepared using:
  60 to 71% by weight of a chlorosilane of formula $R^1SiCl_3$,
  19 to 25% by weight of a chlorosilane of formula $(R^2)_2SiCl_2$,
  7.5 to 16.5% by weight of a chlorosilane of formula $(R^3)_3SiCl$, and
  optionally an aromatic hydrocarbon AH,
  in which formulae the symbols $R^1$, $R^2$, and $R^3$, which are identical or different, each represent:
    a linear or branched alkyl radical containing from 1 to 8 carbon atoms,
    a cycloalkyl radical containing from 5 to 8 ring carbon atoms, optionally substituted with at least one halogen,
    an aryl radical containing from 6 to 12 carbon atoms which are optionally substituted with at least one halogen
    a radical with an alkyl part containing from 5 to 14 carbon atoms and an aryl part containing from 6 to 12 carbon atoms optionally substituted with at least one halogen,
    an alkyl containing from 1 to 6 carbon atoms and/or an alkoxyl containing from 1 to 3 carbon atoms,
    a hydrogen atom, and
    an alkenyl radical containing from 2 to 6 carbon atoms.

3. The process of claim 2, wherein when $R^1$, $R^2$, and $R^3$ represent a linear or branched alkyl radical, the radical is a methyl, an ethyl, a propyl or an octyl.

4. The process of claim 3, wherein the radical is a methyl.

5. The process as claimed in claim 2, wherein $R^1$, $R^2$, and $R^3$ is an aryl radical optionally substituted with at least one halogen.

6. The process of claim 5, wherein the aryl radical is a phenyl or a dichlorophenyl.

7. The process as claimed in claim 1, wherein in step g), the organic compound O containing at least one epoxy group E is added in an amount of between 0.1% and 1% by weight relative to the weight of the silicone resin R.

8. The process as claimed in claim 1, wherein in step g), the organic compound O containing at least one epoxy group E is the 2-ethylhexyl ester of epoxidized soybean fatty acids.

9. The process as claimed in claim 1, wherein in step b), the two-phase mixture B comprises an aqueous hydrochloric acid solution CA and of an aromatic hydrocarbon AH, and wherein the hydrochloric acid concentration is less than 25% by weight relative to the aqueous phase of the two-phase mixture B.

10. The process as claimed in claim 1, wherein in step b), after the mixture A has been added to a two-phase mixture B, the concentration of aromatic hydrocarbon AH is between 40% and 70% by weight relative to the total weight of the chlorosilanes in step a) and of the aromatic hydrocarbon AH.

11. The process as claimed in claim 10, wherein the concentration of the aromatic hydrocarbon AH is between 49% and 61% by weight relative to the total weight of chlorosilanes used and of the aromatic hydrocarbon AH.

12. The process as claimed in claim 1, wherein the aromatic hydrocarbon AH is toluene, xylene or a mixture thereof.

13. A storage-stable mixture X obtained by the process as described in claim 1, the mixture X comprising a silicone resin R and an organic compound O containing at least one epoxy group E.

14. An aqueous silicone dispersion Y comprising:
  at least one mixture X as described in claim 13,
  at least one surfactant S, and
  water W.

15. The aqueous silicone dispersion Y as claimed in claim 14, wherein the dispersion Y is in the form of an oil-in-water emulsion.

16. A paint P comprising the aqueous silicone dispersion Y as described in claim 14.

17. A method of making a paint, the method comprising making the paint with the aqueous silicone dispersion Y as described in claim 14.

18. A method of impregnating a porous construction material, the method comprising impregnating the construction material with a nonaqueous waterproofing composition, wherein the nonaqueous waterproofing composition is a liquid silicone composition L comprising at least one mixture X as described in claim 13.

19. A process for waterproofing porous a construction material, the process comprising applying a nonaqueous liquid silicone composition L comprising at least one mixture X as described in claim 13 to the construction material.

20. The process as claimed in claim 19, wherein the porous construction material is substrate selected from the group consisting of: stone, concrete, mortar, brick, tile and wood.

21. The process as claimed in claim 1, wherein the linear or branched alkyl radical is a methyl, an ethyl, a propyl or an octyl.

22. The process as claimed in claim 1, wherein the linear or branched alkyl radical is a methyl.

23. The process as claimed in claim 1, wherein the aryl radical is optionally substituted with at least one halogen.

24. The process according to claim 23, wherein the aryl radical is a phenyl or a dichlorophenyl.

25. The process according to claim 1, wherein when the stirring of step (c) is maintained, it is maintained from 1 to 8 hours.

26. The process according to claim 1, wherein the isolation and washing of the solvent phase in step (e) is performed until the pH of the water used in the washing is neutral.

27. The process of claim 1, wherein the silicone resin R is isolated from the solvent phase by devolatization.

28. The process of claim 1, wherein when $Z^1$, $Z^2$, or $Z^3$ represent a linear or branched alkyl radical, the radical is a methyl, and ethyl, an ethyl, a propyl or an octyl.

29. The process of claim 28, wherein the radical is a methyl.

30. The process of claim 1, wherein $Z^1$, $Z^2$, or $Z^3$ are an aryl radical and the aryl radical optionally substituted by at least one halogen.

31. The process of claim 30, wherein the aryl radical is a phenyl or a dichlorophenyl.

32. The process as claimed in claim 1, wherein the weight content of the organic compound O containing at least one epoxy group E is between 0.1% and 0.75% relative to the weight of the silicone resin R.

33. An aqueous formulation F, useful in the formulation of paints, the formulation comprising:
  one or more organic dispersions, optionally selected from organic dispersions comprising a (co)polymer of styrene and/or a (co)polymer of (meth)acrylic acid;
  up to 150% by weight relative to the total weight of the one or more organic dispersions of an aqueous silicone dispersion Y as described in claim 14;

a siliceous or nonsiliceous filler, optionally selected from the group consisting of: precipitated silica, fumed silica, colloidal silica or silica powder, carbonates, talc, $TiO_2$, and mixtures thereof; and at least one compound selected from the group consisting of:
- a thickener selected from the group consisting of acrylic cellulose-based thickeners, polyurethanes, natural gums, and mixtures thereof:
- a coalescer originally selected from organic solvents and optionally from glycols and/or aliphatic petroleum fractions;
- a wetting agent or dispersant optionally selected from phosphates and/or polyacrylics;
- a surfactant;
- a neutralizing agent;
- a biocide;
- a diluent;
- a plasticizer, optionally selected from nonreactive silicone oils;
- an antifoam; and
- a pigment or colorant (organic or mineral).

34. The aqueous formulation F as claimed in claim 33, wherein the silicone dispersion is present at between 40% and 100% by weight relative to the total weight of one or more organic dispersions.

35. A paint P comprising the aqueous formulation F as described in claim 33.

36. A method of making a paint, the method comprising making the paint using the aqueous formulation F as described in claim 33.

* * * * *